June 9, 1942. W. J. PODBIELNIAK 2,286,157
METHOD OF SECURING COUNTER-CURRENT CONTACT BETWEEN FLUIDS
Filed Aug. 6, 1937 3 Sheets-Sheet 1
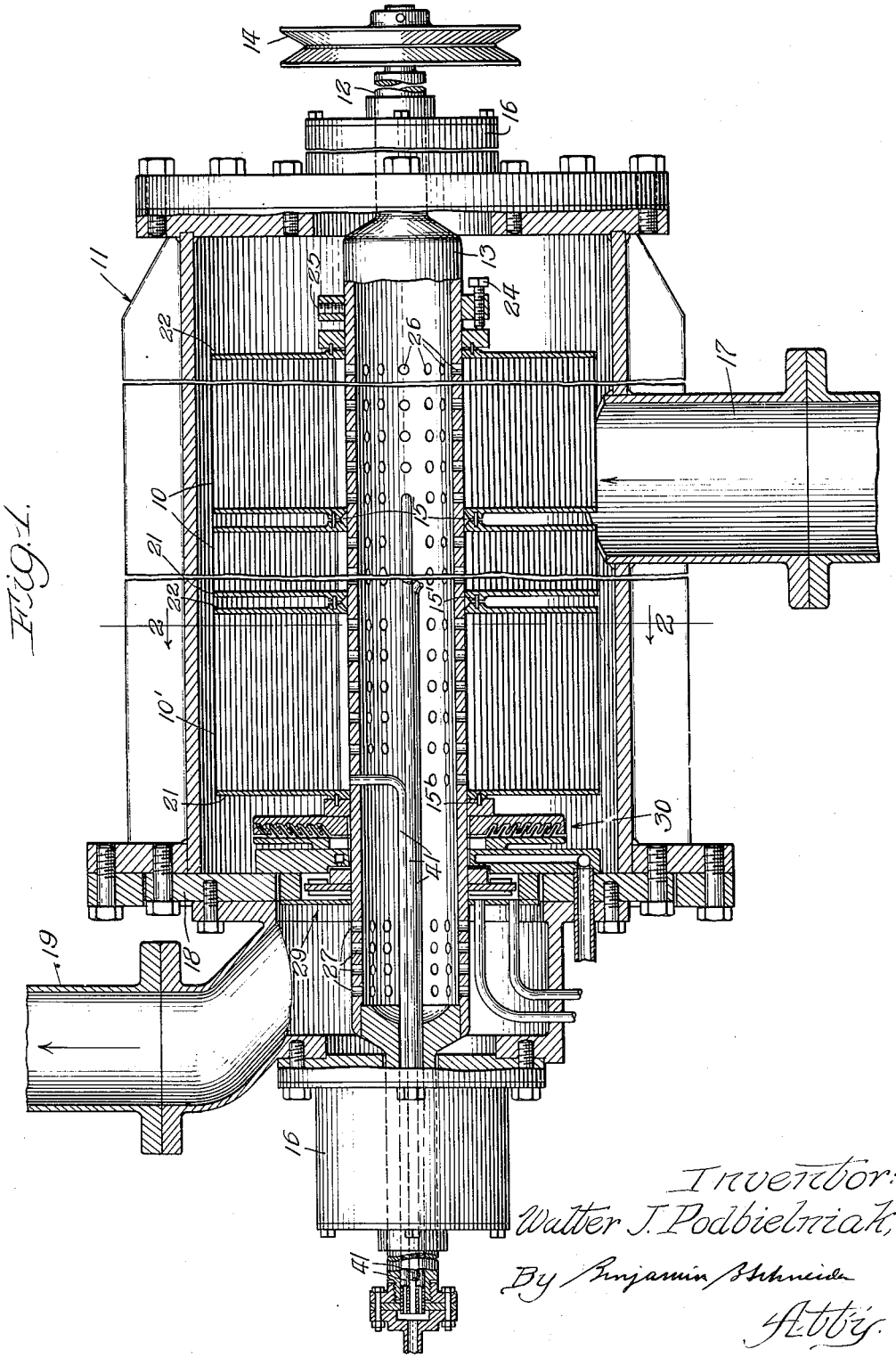
Inventor:
Walter J. Podbielniak,
By Benjamin Schneider
Atty.

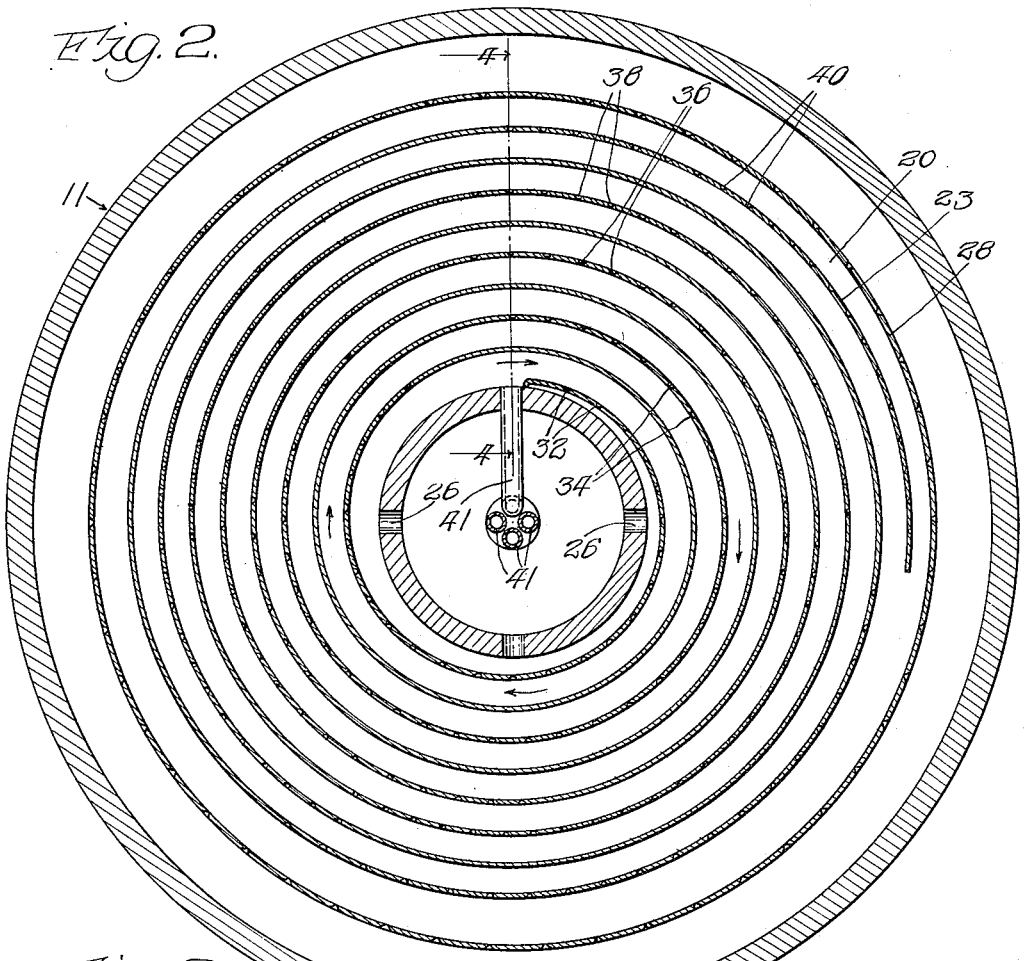
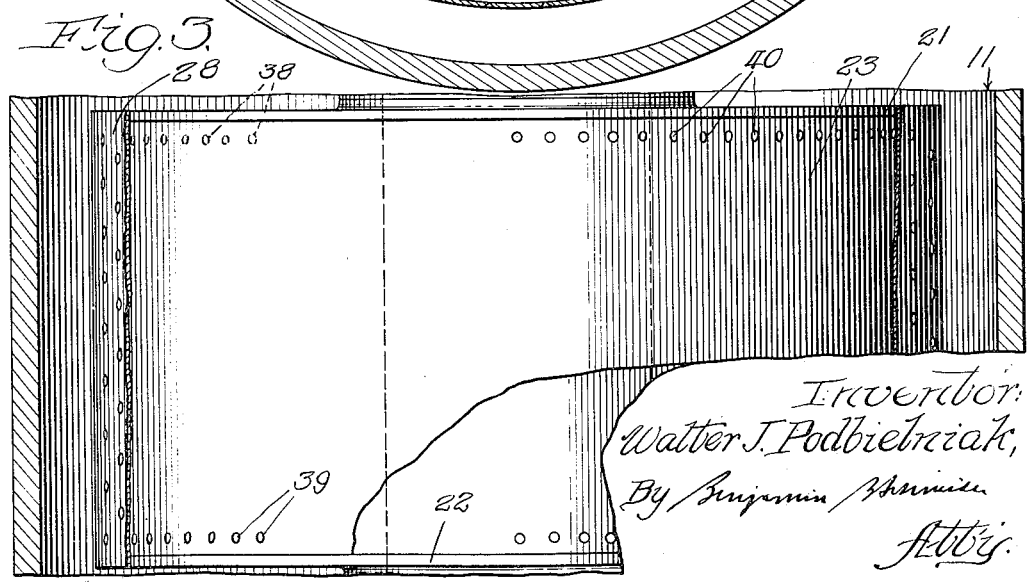

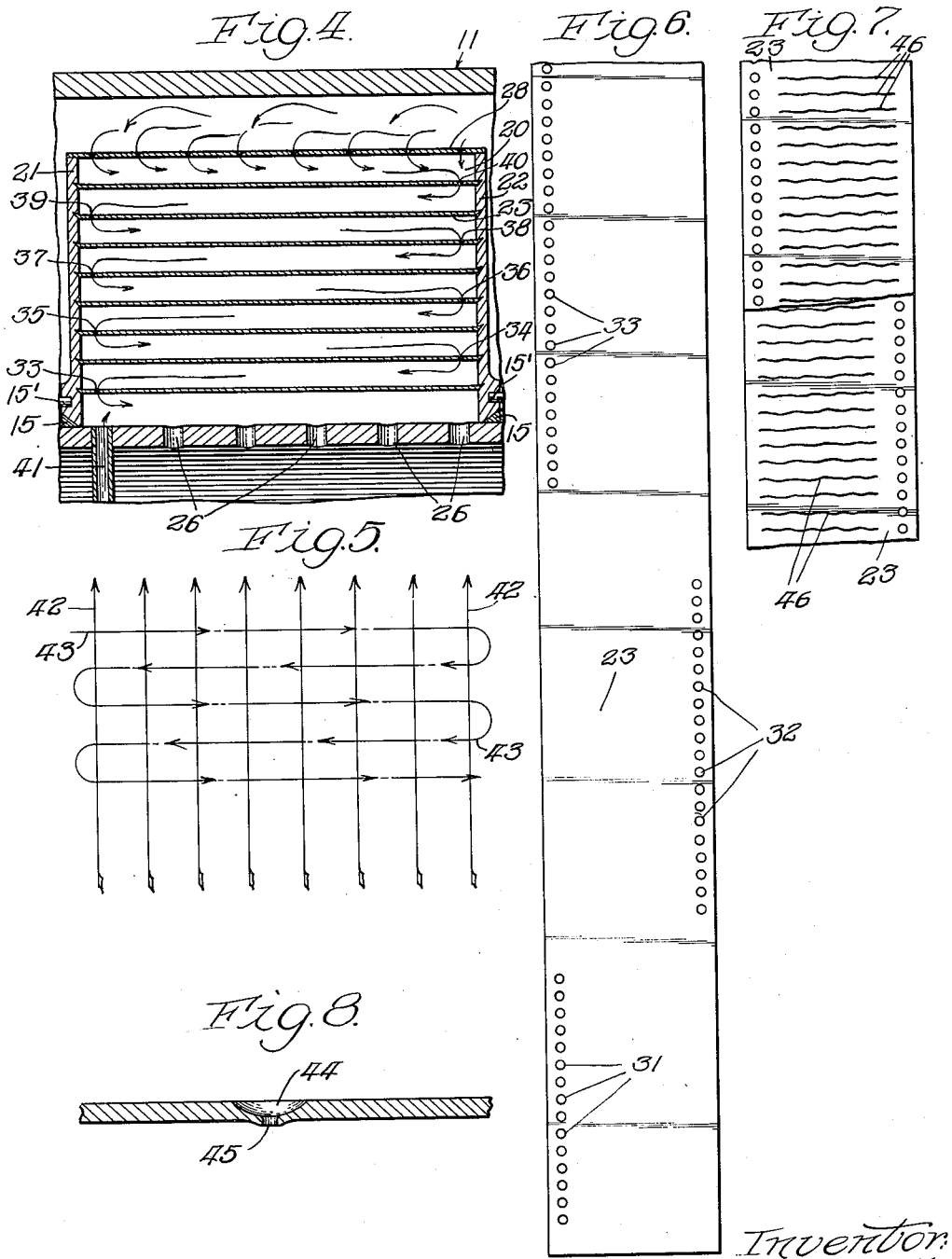

Patented June 9, 1942

2,286,157

UNITED STATES PATENT OFFICE 2,286,157

METHOD OF SECURING COUNTERCURRENT CONTACT BETWEEN FLUIDS

Walter J. Podbielniak, Chicago, Ill., assignor to Benjamin B. Schneider, Chicago, Ill.

Application August 6, 1937, Serial No. 157,814

7 Claims. (Cl. 261—83)

This invention deals with the art of securing counter-current flow or contact and interchange between fluids by application of centrifugal force and may be utilized for purposes of distillation and fractionation, absorption, scrubbing, air conditioning, heat exchange, promotion of chemical reactions, or contacting of partly or wholly immiscible liquids, although not limited to such processes. In order that the invention may be fully understood, it is exemplified herein in connection with a process for the fractional distillation of fluids having constituents of different boiling points. The invention is not limited to such processes, nor the details thereof as set forth herein except as defined in the appended claims.

This application is related to my prior co-pending application entitled Centrifugal fluid-treating apparatus, Serial No. 87,224, filed June 25, 1936 (now Patent No. 2,209,577, granted July 30, 1940) and may be readily adapted to treat air to condition it as therein described; it is an improvement of the inventions described and claimed in my prior Patents Nos. 2,004,011, dated June 4, 1935, and 2,044,996, dated June 23, 1936.

In my prior Patents Nos. 2,004,011 and 2,044,996, I describe apparatus and methods for the counter-current treatment of fluids of different densities, for reaction, fractional distillation for heat exchange purposes, etc., wherein a more effective counter-current treatment and more accurate fractionation or distillation of said fluids may be effected. In employing the apparatus and methods therein set forth, counter-current flow between a liquid condensate or reflux and a lighter fluid or vapor is brought about by means of centrifugal force, the reflux or heavier liquid being thereby caused to flow outwardly through a tube or passageway of increasing radius, directly counter-current to an inwardly moving lighter fluid or vapor.

In the prior commercial attempts to separate the fractions or constituents of comparatively high boiling point and high molecular weight, whether in petroleum or other complex mixtures, heretofore insurmountable difficulties have been encountered such as prevent precise fractionation and isolation of the higher boiling point constituents, due chiefly to the increasing complexity of isomeric compounds for any given boiling range, and because of the extreme closeness in boiling point of many of the heavier constituents. In so far as I am aware, the separation of the heavier fractions having boiling points within a range of about 6° C. cannot be practically accomplished on any substantial scale by fractionating equipment heretofore employed. By the method of the present invention, I am enabled to secure a fractional distillation by which volatile mixtures may be separated into their pure constituents, or single compounds, or into fractions having an extremely close boiling point range which may be as low as 1° C. or less. The invention provides further an apparatus and method of securing the effectiveness of counter-current contact necessary to accomplish such close fractionation without the requirement for large and complicated equipment as in the prior art.

In the present invention I have developed improvements in the apparatus and methods of the character shown and described in my above-mentioned patents as well as provided apparatus and methods especially suitable for fractionation, air conditioning, gas and liquid contact and the like. In accordance with the present invention contact between the fluids of different densities is brought about by causing the relatively lighter fluid to move in a spiral passageway, obliquely transversely from one side to the other, and counter-current to the heavier fluid urged out of the spiral passageway by centrifugal force in a composite spiral and shuttle-wise direction; that is, the relatively lighter fluid is caused to move in a zig-zag or oblique shuttle-wise direction inwardly through the spiral passageway and the heavier fluid is propelled outwardly in an advancing spiral path.

The description of the present invention is made in connection with a type of construction which is adapted to operate in accordance with my improved method for the treatment of vapors from a kettle or still by condensate or reflux formed within the system or reflux added to the system. It will be understood, however, that the invention in its broader aspects is in no way to be regarded as limited to the particular construction shown herein since the hereinafter described form of the invention is but typical of a variety of constructions that may be used in practicing the invention.

Referring to the drawings:

Figure 1 is a view, with parts in section and partly broken away, of apparatus suitable for carrying the invention into effect;

Figure 2 is an enlarged transverse sectional view of a rotor section taken along the line 2—2 of Fig. 1 and showing the spirally wound sheet and the arrangement of the openings therein to effect the desired transverse movement of the lighter fluid;

Figure 3 is a view looking down on one of the rotor sections, with parts broken away, and showing in greater detail the arrangement of the openings in the spiral sheets;

Figure 4 is a transverse section taken along the line 4—4 of Fig. 2 and showing the movement of the lighter fluid through the rotor section;

Figure 5 is a diagrammatic view showing the direction of movement of the lighter and heavier fluids through the spiral passageway;

Figure 6 is a partial view of the sheet prior to being wound in the form of a spiral and showing the arrangement of the openings for the lighter fluid;

Figure 7 is a similar view showing a modified form of sheet; and

Fig. 8 is an enlarged detailed sectional view taken through one of the openings in the spirally wound sheet and showing the construction of the openings.

Referring particularly to Fig. 1, a plurality of rotor sections 10 are provided in which the fluids to be treated are brought into contact by an obliquely transverse (from one side to the other) movement of the lighter fluid, counter-current to the outward spiral movement of the heavier fluid. The rotor sections 10 are rotatably mounted within a stationary housing 11 on a hollow hub 13. The hub is provided with extensions or shafts 12 which rotate in and are held by stationary radial bearings or the like positioned within combination stuffing and bearing boxes 16. The power for rotating the shafts 12, and in turn the hub and rotors, is transmitted from some suitable source to the pulley 14 mounted on one of the shafts 12, as by a motor and belt (not shown). Mutual rotation of the rotor sections 10 is effected by the dowel pins 15' and mutual rotation of the rotor sections and the hub 13 is effected by the frictional engagement of the beveled wall of the rotor sections with the sides of the metal rings of triangular cross-section integrally secured to the rotor as at 15.

The housing 11 is fluid-tight and is provided with an inlet 17 through which the lighter fluid or vapor undergoing treatment enters. It is also provided with a lateral centrally disposed opening in the cover-plate 18 through which one end of the hub 13 extends and through which communication is established between the interior of the rotor sections 10 and an outlet 19 for the treated vapors.

The rotor sections 10 within the housing 11 are each provided with a spiral passageway 20 (see Figs. 2 and 4) which opens at its outer turn within the housing 11. Each rotor section 10, the first being designated 10', is in the form of a drum and is provided with circular end plates 21 and 22 between which the successive turns of spirally wound sheets 23 are retained to form the passageway 20. The edges of the spirally wound sheets 23 are forced into spiral grooves in the opposed faces of the end plates 21 and 22 to form fluid-tight joints as in my above-mentioned prior applications and the assemblies are retained in a unitary structure as by the adjustable stud-bolts 24 and the set-screws 25.

A perforated sleeve or shell 28 surrounds the spiral sheet of each rotor section and is secured to the end plates 21 and 22 in any desired manner, as by a weld (Fig. 4). The perforations in shells 28 are of a size and number to permit the ready ingress of the kettle vapors or other light fluid to the spiral passageway 20.

The outermost turn of each spirally wound sheet 23 forms with the adjacent turn thereof an entrance for lighter fluids to the passageway 20. The innermost turn of each sheet 23 forms with its adjacent turn a passageway which communicates with the interior of hub 13 through a series of openings 26 and thus provides for the passage of fluids into and out of the rotor sections. A portion of the hub 13 outside of the rotor section 10' and intermediate this section and a second series of openings 27 in hub 13, which lead to the outlet 19, is imperforate and provides a passageway for the fluid passing from the rotors to the outlet 19 as well as for the reflux or heavier fluid passing into the rotor. It is now apparent that vapors, gases or other light fluid entering the device will flow under a suitable pressure differential through the inlet 17 into the housing 11 and from it into the spiral passageway 20, traverse the latter, and pass out through the openings 26 in hub 13, through the imperforate portion of hub 13 outside of rotor section 10', through openings 27 and thus through the outlet 19. From the outlet, the treated vapors pass to a condenser or other receiving device (not shown) for a purpose to be described.

Heavy fluid supplied to the apparatus, for example, condensate or reflux in a fractionation operation, or the counter exchange fluid in a contacting or air-conditioning operation, is made use of in a liquid centrifugal seal, designated as a whole by the numeral 29, to prevent the escape of vapors between the housing 11 and the outlet 19 and to prevent the vapors from issuing from the apparatus without first being treated in the rotor sections. Liquid centrifugal seal 29 may be suitably of the vane and recess type as described in my prior copending application Serial No. 87,223, filed June 25, 1936 (now Patent No. 2,153,640, granted April 11, 1939). In addition, I may provide a form of seal, which may be suitably called a labyrinth seal, designated as a whole by the numeral 30, which is positioned within the housing 11 adjacent the centrifugal seal 29 and in the path of the vapors between the housing 11 and seal 29. Labyrinth seal 30 serves as a buffer to prevent direct communication between the kettle vapors in housing 11 and centrifugal liquid seal 29 and is adapted to resist the flow of kettle vapors therethrough and to modify the character of any vapors passing therethrough for a purpose and in a manner fully described in my copending application entitled Centrifugal fluid treating apparatus and seal, Serial No. 157,516, filed Aug. 5, 1937. (Now Patent No. 2,172,222, dated Sept. 5, 1939.)

In my prior application Serial Nos. 87,223 and 87,224, and patents referred to above, intimate contact between the heavier and relatively lighter fluid is brought about by a direct counter-current movement in which the fluid of greater density is caused to move outwardly in an advancing spiral path by means of centrifugal force and the fluid of lesser density to move directly inwardly in a contracting spiral path by means of a sustained pressure differential. In my prior application, Serial No. 9,923, (now Patent No. 2,281,796, granted May 5, 1942), intimate contact between the fluids is effected in the specific passageway therein described, wherein the lighter fluids is urged alternately across and inwardly through the passageway in direct counter-flow to the outwardly propelled heavier fluid.

In practicing the present invention I utilize the same general principle set forth in these applications but in addition I effect a desired modified shuttlewise movement of the lighter fluid to increase the capacity of the system for treating lighter fluids without unduly sacrificing efficiency in operation. Thus in accordance with the present invention, the fluid of greater density is caused to move outwardly in an advancing spiral path as before, and the fluid of lesser density is caused to move not only inwardly in the same path and counter-current to the heavier fluid but at the same time is caused to have a modified movement which is obliquely transverse to the heavier fluid. The movement of lighter fluid appears to be substantially in the direction of the vectorial component of the transverse or shuttlewise component and the inward component of force and thus the fluid zig-zags back and forth across the passageway as it progresses inwardly therein. In this manner, for a given length of spiral passageway, I can increase the capacity of the apparatus to treat vapors without unduly sacrificing effectiveness and efficiency of treatment.

The method embodying my invention may be more fully understood in connection with the above described apparatus wherein the desired oblique shuttlewise inward movement of the vapors is brought about by a particular arrangement of openings in the spiral sheet 23 through which the vapors are caused to flow while being urged through the spiral passageway; however, my invention is not to be construed as limited to this arrangement or character of opening as it will be apparent hereinafter that the size, number and arrangement of openings forming passageways for the lighter fluid in its travel through the spiral passageways of the rotor sections can be varied at will to meet any desired need. Thus, for example, and referring particularly to Figs. 2, 3, 4 and 6, it will be apparent that the spirally wound sheet 23 in its prewound state (Fig. 6) is in the form of a flat sheet or strip which may suitably be provided with a planned arrangement of openings, to meet any desired need such as an increase in the capacity of the apparatus to treat vapors or gases. The flat sheet or strip 23 may suitably be formed with a series of rows of openings adjacent to the side edges of the sheet, each row of openings along the respective sides of the sheet being spaced from each other and the rows of openings along one side being offset or staggered with respect to the rows of openings along the other side, and the number of openings in each row increasing progressively as the rows of openings are further removed from the end of the sheet that forms the inner or core end of the spiral. The staggered arrangement of the rows of openings along the edges of the sheet and the progressive increase in the number of openings in each row as the rows recede from the inner end of the sheet continue along the entire length of the sheet; the spacing or extent of stagger between the successively staggered rows, progressively increases as the rows recede from the inner end of the sheet. In this manner the sheet 23 when formed into the spiral shown in Figs. 2, 3 and 4, will provide the spiral passageway 20 in which the counter-current movement of both the heavier and lighter fluids will take place and the openings 32 to 40 will provide the passageways through which the desired oblique shuttlewise or zig-zag movement of the lighter fluid or vapor is effected. By virtue of the staggered rows of openings and the spacing or extent of stagger between the successively staggered rows of openings, by-pass of lighter fluid or vapor between the rows of directly underlying openings is prevented as clearly shown in Fig. 2. In this figure the openings are shown along only one side of the sheet and in their relative positions in the spiral. Thus in the above described apparatus, an oblique shuttlewise and progressive inward movement of vapors is effected throughout the entire length of the passageway in the rotors while the liquid is propelled outwardly therefrom in a manner to be described. Obviously, the number of rows of openings in each spiral will vary depending upon the length of the sheet forming the spiral and the pitch between the turns.

I have found that the lighter fluid or vapor moving through this novel spiral passageway has a shuttlewise velocity which is a function of the periphery of each turn of the spiral sheet, the distance between the turns, the amount of vapor introduced into the passageway and the cross-sectional area of the openings through which the vapor is introduced. It is thus apparent that the shuttlewise velocity of the vapor can be controlled to meet any desired need by a variation of one or more of the above factors. I prefer, however, to control the shuttlewise velocity of the vapor by variations in the character, arrangement and size of the openings in the spiral sheet. By a suitable arrangement of the openings in the spiral sheet I can readily control the pressure drop or resistance to shuttlewise movement of the vapor and thereby control the distribution of vapor between the inward spiral and inward shuttlewise modes of motion.

The arrangement of openings shown and described in connection with Figs. 2, 3, 4 and 6 is, as above set forth, merely exemplary of one specific manner for controlling the oblique shuttlewise, inward movement of the vapors through the spiral passageway; however, my invention is not to be construed as limited to this arrangement of openings as other suitable arrangements may be employed to meet any desired need. Thus, the rows of openings may be staggered as shown in Fig. 6 but the number of openings in the row nearest to the inner or core end may be the greatest and the number in each row may progressively decrease as the rows recede from the inner end; or the number of openings in each row may be the same and the space between each opening may progressively increase or decrease (as desired) as the rows recede from the inner end. If desired, the vapor may be introduced into the spiral passageway through openings in the longitudinal center of the outer turn of the spiral, the vapors passing therethrough being then caused to diverge and pass through openings along both edges of the next succeeding turn, then caused to converge and pass through center openings in the next succeeding turn, etc. throughout the spiral passageway.

In the operation of the apparatus and in accordance with my invention, gases or vapors or both from the kettle enter the housing 11 and pass through the spiral passageway 20 of the rotor sections. The rotor sections are rotated to develop a centrifugal force, the effective component of which may be approximately equal to the force of gravity or even less, although I prefer that it be substantially in excess of the force of gravity. In general, I have found it advisable to employ conditions of operation, rates of rotation and the like so that the tangential component of the centrifugal force effective in the operation is equivalent to five or more times the force of gravity. A speed of rotation of 500 to 2000 R. P. M. or higher has been found suitable. The gases and vapors from the kettle are under pressure such that they pass against centrifugal force set up by rotation, through the perforated shell 28, and through the passageways 20 in an oblique shuttlewise and progressively countercurrent manner to the heavier fluid or reflux passing outwardly through the passageway 20. When the vapors have passed inwardly through the passageway 20, they pass through the openings 26 into hub 13, through the hub and out thereof through the openings 27 and thence through the exit conduit 19. The vapors then may pass to a condenser. Some of the vapors will, in general, condense in passageways 20 to form reflux liquid, but the main supply of reflux is returned to the system from the reflux condenser as through a suitable main feed line (not shown) and the reflux conduits 41 (Fig. 1) which extend through the shaft 12 adjacent the centrifugal seal 29. Each reflux conduit 41 feeds reflux directly to each rotor section and thus insures an adequate and uniform supply of reflux for each rotor section to effect the desired counter-current contact. It is of course to be understood that the number of reflux conduits will vary depending on the number of rotor sections mounted on hub 13 and that a single conduit positively feeds reflux to a single rotor section.

The reflux from the condenser is so controlled that the portion not needed by the system is drawn off through a suitable valve and the remaining reflux is returned to the system through a suitable main feed line connecting with the conduits 41, and through the openings 26 to treat the vapors as described in my prior applications and patents referred to above.

The reflux flows directly into each of the passageways 20 of the rotor sections. Reflux entering and formed in the passageways 20 flows outwardly and uniformly therethrough in a film of substantially uniform thickness against one wall of the passageway, due to centrifugal force, countercurrently to the oblique shuttlewise and progressively inward moving stream of vapor. The relatively denser and heavier reflux therefore contacts and scrubs relatively lighter gases and vapors, the two streams of fluid being brought together intimately at their surfaces of contact by the centrifugal force applied. The reflux liquid then discharges from the rotor sections and collects in the bottom of housing 11 from which it drains back to the kettle in any desirable manner.

The movement of the vapors or gases and the reflux through the spiral passageways 20 is clearly apparent from an inspection of Figs. 3 and 4. The vapors passing through the perforated sleeve 28 enter the entrance to the spiral passageway as well as the openings 40 in the outer turn of the spiral sheet 23 and are thus introduced into the spiral passageway 20. These merged streams of vapors then obliquely shuttle across and simultaneously progress inwards into the spiral passageway and pass through the openings 39. Of course, some of the vapors tend to flow directly inwardly and some of these vapors merge with those passing out of openings 39 and the merged streams effect a reverse shuttlewise and inward movement of the vapors and are caused to pass through the openings 38. This same shuttlewise or zig-zag movement of the vapors is effected throughout the length of the passageway and ultimately the vapors pass out of the passageway through openings 32 adjacent the core end of the spiral (Fig. 2). The vapors then pass through the openings 26 in hub 13 through the imperforate portion of the hub, through openings 27 and thus to the outlet 19.

This movement of the vapors in the spiral passageway is represented diagrammatically in Fig. 5. The straight line parallel arrows 42 represent the direction of flow of the centrifugally propelled outwardly moving stream of reflux and the zig-zag line 43 represents the direction of flow of the pressure-propelled, inwardly moving stream of vapor. It will be apparent from this diagram taken in conjunction with the apparatus described, that the vapors contact the liquid reflux continuously during the oblique shuttlewise and progressive inward movement of the vapors through the passageways; that is, during their movement in the direction of the vectorial component of the shuttlewise and inward components of force.

The pressure of the vapors throughout the passageway and especially on the openings in the spiral sheet appears to prevent at least partly the tendency of particles of centrifugally propelled reflux to tear away from the continuous film of reflux and pass through these openings and thus short-circuit through the passageway. To augment the resistance to the flow of reflux through the openings, the openings may be formed, for example, as shown in Fig. 8, with a saucer-shaped depression 44 on the vapor inlet side and with lips or projections 45 on the under or vapor exit side.

While I have described and illustrated apparatus particularly adapted to perform the method of my invention as applied to fractionating vapors derived from distilling complex liquids as for example crude petroleum, it will be understood that I do not limit myself to such particular field of application of the process or method of my invention. Obviously, this method may be utilized to modify the constituents of a fluid by an oblique shuttlewise and counter-current contact with a different fluid of different density, such fluids being at least partially immiscible, and one or both of which may be a liquid, as in absorption processes, air conditioning, heat exchange, and other counter current treatment processes.

In certain instances of counter-current contact between fluids of different densities in accordance with my invention, a turbulence in the flow of one or more of the fluids is desired to obtain a more intimate contact between them. While the change of direction, expansion and contraction of the vapors passing through the openings in the spiral sheet doubtless causes a turbulence in the flow thereof, I may augment this turbulency by the provision of suitable flutings or corrugations 46 in the sheet 23, as shown in Fig. 7, over which the heavier fluid passes in its travel through the passageway.

My invention is not to be construed as limited to rotor sections having a single spiral sheet forming a single spiral passageway as the invention is equally applicable to rotor sections having a plurality of spiral passageways formed by a plurality of spirally wound sheets.

I claim:

1. In apparatus for effecting counter-current contact between fluids of different densities, a housing, a rotor rotatably mounted therein and means for rotating said rotor, said rotor comprising a spirally wound sheet forming a passageway of increasing radius, said sheet having a series of rows of openings adjacent to the side edges thereof, each row of openings along the respective sides of the sheet being spaced from each other and the rows of openings along one side being staggered with respect to the rows of openings along the other side, the number of openings in each row increases progressively as the rows of openings recede from the core end of the spiral sheet, and the spacing between the said rows of openings also increases progressively as the rows recede from said core end.

2. In the apparatus set forth in claim 1 wherein the said spiral sheet is transversely fluted substantially throughout the length thereof.

3. Apparatus of the character described comprising means forming a passageway of increasing radius, means for supplying vapors to the outer end of said passageway and for urging them inwardly therethrough in contact with cooling liquid, means for rotating said passageway whereby cooling liquid formed in or supplied to said passageway is propelled outwardly thereof by centrifugal force and means for by-passing a portion of the vapors passing through said passageway in such manner as to induce a flow of said vapors across the path of flow of said liquid as they are being urged inwardly through the passageway whereby the path of flow of said vapors is in an oblique shuttlewise direction with respect to the path of flow of said liquid.

4. Apparatus of the character described comprising a housing, a rotor rotatably mounted therein and a spirally wound sheet forming a passageway of increasing radius within said rotor, means for supplying vapors to the outer end of said passageway and for urging them inwardly therethrough in contact with cooling liquid, means for rotating said passageway whereby cooling liquid formed in or supplied to said passageway is propelled outwardly thereof by centrifugal force and means comprising non-aligned openings on opposite sides of said spirally wound sheet for by-passing a portion of the vapors passing through said passageway in such manner as to induce a flow of said vapors across the path of flow of said liquid as they are being urged inwardly through the passageway whereby the path of flow of said vapors is in a shuttlewise direction with respect to the path of flow of said liquid.

5. The method of separating the constituents of a gas or vapor mixture by counter-current contact thereof with a cooling liquid in a passageway of increasing radius which comprises supplying said gas or vapor mixture to the outer end of said passageway under pressure sufficient to force it inwardly to the center thereof in contact with cooling liquid, supplying said cooling liquid to said passageway, rotating said passageway to secure by centrifugal action an outwardly propellant force to propel said liquid outwardly through the passageway, and by-passing a portion of said gas or vapor mixture in such manner as to deflect the path of flow of said gas or vapor mixture across the path of flow of said liquid as said gas or vapor mixture is being urged inwardly whereby said gas or vapor mixture moves inwardly through the passageway in a shuttlewise direction with respect to the path of flow of said liquid.

6. The method of modifying fluids of different densities by counter-current contact in a passageway of increasing radius which comprises supplying one of said fluids of greater density to the center of said passageway to secure by centrifugal action an outwardly propellant force to propel said fluid of greater density outwardly through said passageway, supplying the other of said fluids of lesser density to the outer end of said passageway under pressure sufficient to force it inwardly through the passageway to the center thereof in counter-current contact with said fluid of greater density, and by-passing a portion of said fluid of lesser density in such manner as to deflect the path of flow of said fluid across the path of flow of said fluid of greater density whereby the fluid of lesser density moves inwardly through the passageway in an oblique shuttlewise direction with respect to the path of flow of the fluid of greater density.

7. The method of modifying fluids of different densities by counter-current contact in a spiral passageway which comprises supplying one of said fluids of greater density to the center of said passageway, rotating said passageway to secure by centrifugal action an outwardly propellant force to propel said fluid of greater density outwardly through said passageway, supplying the other of said fluids of lesser density to the outer end of said passageway under pressure sufficient to force it inwardly through the passageway to the center thereof in counter-current contact with said fluid of greater density, and by-passing a portion of said fluid of lesser density in such manner as to deflect the path of flow of said fluid across the path of flow of said fluid of greater density whereby the fluid of lesser density moves inwardly through the passageway in an oblique shuttlewise direction with respect to the path of flow of the fluid of greater density.

WALTER J. PODBIELNIAK.